April 19, 1966        A. N. ORMOND        3,246,890

UNIVERSAL FLEXURE DEVICES

Filed Oct. 25, 1963        3 Sheets-Sheet 1

INVENTOR.
ALFRED N. ORMOND
BY Elliott & Pastoriza
ATTORNEYS

April 19, 1966   A. N. ORMOND   3,246,890
UNIVERSAL FLEXURE DEVICES
Filed Oct. 25, 1963   3 Sheets-Sheet 3

INVENTOR.
ALFRED N. ORMOND
BY *Elliott & Pastoriza*
ATTORNEYS

United States Patent Office 3,246,890
Patented Apr. 19, 1966

3,246,890
UNIVERSAL FLEXURE DEVICES
Alfred N. Ormond, 11969 E. Riviera,
Santa Fe Springs, Calif.
Filed Oct. 25, 1963, Ser. No. 319,065
13 Claims. (Cl. 267—1)

This invention relates generally to flexure joints and more particularly to improved universal type flexure joints in which omni-directional movements with respect to a single center point may be effected.

Conventional flexures serve as substitutes for hinges or pivots and usually take the form of a thin web of metal adapted to be flexed about a medial bending axis. By compounding two such flexure webs and orienting them in planes forming an angle with respect to each other, omni-directional flexing movement may be realized. In order, however, that such omni-directional movement take place with reference to a single point, it is necessary that the respective medial bending axes of the two flexures intersect to define the point.

The present invention has to do with improved universal type flexures formed from combinations of simple flexure webs in such a manner as to provide omni-directional movement with respect to a single point and yet be capable of withstanding relatively large tension and compression forces, as well as twisting moments. In other words, the improved universal flexures of this invention are particularly characterized in that they can resist all forces not in the plane of the desired omni-directional flexing movements. Also, the flexures are designed to resist moments or torques.

The present invention also is concerned with universal flexures in which the portion of the flexure to be secured to a stationary structure lies substantially in the plane of attachment of the supported body to the flexure. In other words, the plane of the omni-directional flexural movements coincides substantially with the plane of securement of the flexure device rather than lying in a plane spaced from the plane of securement, as is the case with some prior art universal flexures wherein opposite ends of the flexure structure are secured respectively to a stationary structure and the body to be mounted by the flexure.

With all of the foregoing in mind, it is, accordingly, a primary objective of this invention to provide improved universal flexures of enabling omni-directional movement of a mounted body to take place with respect to a single point and in which the flexure offers a high resistance to movements in planes other than the plane defining the omni-directional movement.

More particularly, it is an object to provide improved universal flexures meeting the foregoing object in which the plane of securement of the flexure is substantially co-planar with the plane in which omni-directional flexural movements may take place.

Other objects of this invention are to provide improved universal flexures which may be relatively economically manufactured as a consequence of unique design principles departing from those characterizing prior art flexures.

Briefly, these and many other objects and advantages of this invention are attained by providing a floating base member. A first principal flexure web means extends from this base member to terminate in a first top means, the flexure web means defining a first medial bending axis extending in a first direction. A second principal flexure web means also extends from the base member and terminates in a second top means, the second flexure web means defining a second medial bending axis in a second direction different from that of the first flexure web bending axis. The two bending axes intersect to define at the cross-over point a single point about which omni-directional flexural movement takes place. In the use of the flexure, the first top means serves as means for securing the flexure to a stationary structure and the second top means as means to secure a body mounted and to be capable of omni-directional movements. The design is such that the plane of the omni-directional movements includes the plane of the securing of the first top means to the stationary structure.

In different embodiments of the invention, the medial bending axes may form a right angle or an angle other than a right angle. Further, suitable side flexure means may be provided to strengthen the structure and provide proper resistance to forces and moments in directions other than the desired flexing directions.

A better understanding of the various different embodiments contemplated by the invention will be had by now referring to the accompanying drawings, in which.

Figure 1:
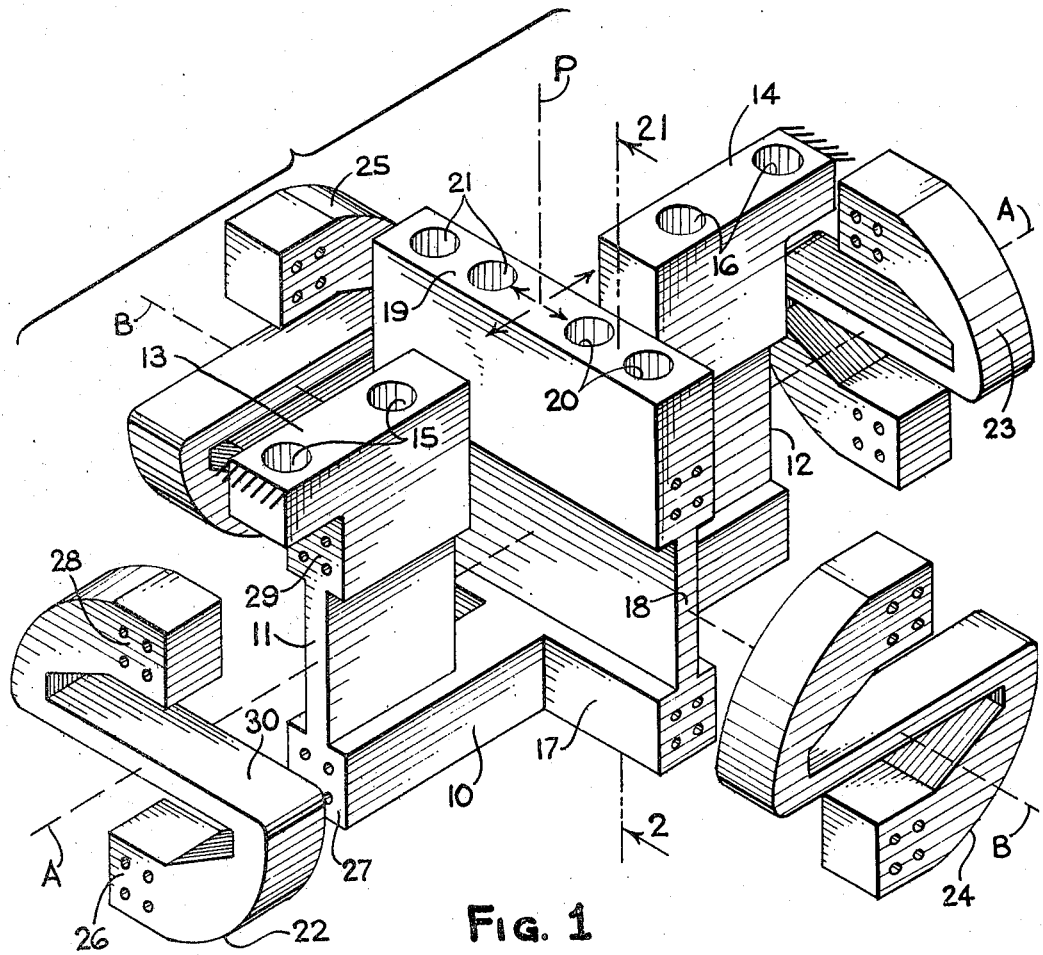
FIGURE 1 is a schematic exploded perspective view of a first embodiment of a universal flexure in accordance with the present invention.

Referring first to FIGURE 1, there is shown a floating base member 10 from which first principal flexure web means 11 and 12 extend generally upwardly in a first plane. As shown, these flexure webs respectively terminate in first top means 13 and 14. These top means simply constitute enlarged structural bodies provided with suitable means for securing the same to a stationary structure such as bore holes 15 and 16.

The first principal flexure web means as shown in FIGURE 1 is split to define the individual flexure webs 11 and 12 there being provided a given space between the adjacent vertical edges of the flexure webs. Extending upwardly in a second plane from a portion 17 of the base 10 is a second principal flexure web means 18 comprising a single flexure web passing through the spacing between the first flexure webs 11 and 12. The second principal flexure web means terminates in a second top means 19 which may be provided with suitable securing means such as bore holes 20 and 21 for securement to a body to be mounted for omni-directional flexural movement.

The medial bending axis of the first principal flexure web means defined by the flexure webs 11 and 12 is indicated by the dashed line A—A. The medial bending axis for the second principal flexure web means 18, on the other hand, is indicated by the dashed line B—B. The design is such that this second medial bending axis intersects the first medial bending axis at a single point in the center of the structure.

In order to provide substantially equal bending restoring forces about each of the medial bending axes A—A and B—B when these axes intersect at right angles, the sum of the widths of the flexure webs 11 and 12 is made substantially equal to the overall width of the flexure web 18. If a body is now mounted to the second top means 19, it may flex omni-directionally as indicated by the movement of the dashed line P in various lateral directions indicated by the arrows. This movement takes place in a plane substantially co-planar with the plane of securement of the first top means 13 and 14. In other words, the base structure 10 and 17 is "floating," the securement of a body to the flexure and the flexure itself to a stationary support being effected in substantially a horizontal plane defined by the first and second top structures 13, 14, and 19.

In the operation of the flexure device described thus far, it will be clear that when a body is secured to the second top means 19, it may flex generally from left to right as viewed in FIGURE 1 and also in a fore and aft direction. The left and right deflection, or deflection generally in the direction of the medial bending axis A—A, takes place about the medial bending axis B—B. Similarly, flexing movement in a fore and aft direction or generally in the direction of the axis B—B, takes place about the medial bending axis A—A. In this respect, the bending forces to the lower portions of the flexure webs 11 and 12 are transmitted from base member portion 17 to the base member portion 10, the base member being secured only to the lower portions of the flexures rather than to a fixed or stationary structure.

To provide strength against twisting moments as might be applied between the top means 13 or 14 and the top means 19, there are included in the structure of FIGURE 1, first side flexure web means indicated at 22 and 23 and second side flexure web means indicated at 24 and 25. The first side flexure web means are arranged to be secured between the base member portion 10 and the first top means 13 and 14 respectively, and the second side flexure web means are arranged to be secured between the base portion 17 and the fore and aft ends of the second top means 19. The design of each of the side flexure web means is identical and therefore detailed description of one will suffice for all.

Thus, referring to the first side flexure web means 22, there is provided a base block portion 26 adapted to be secured to the end of the base member portion 10 as at 27, suitable bore holes being provided for this purpose. Similarly, there is provided an upper block portion 28 arranged to be secured to the top means 13 as at 29. Between the block members 26 and 28 there is defined a flexure web 30 having a medial bending axis in alignment with the medial bending axis A—A. The plane of the side flexure web 30, however, is preferably horizontal or at right angles to the plane of the first principal flexure web 11.

Figure 2:
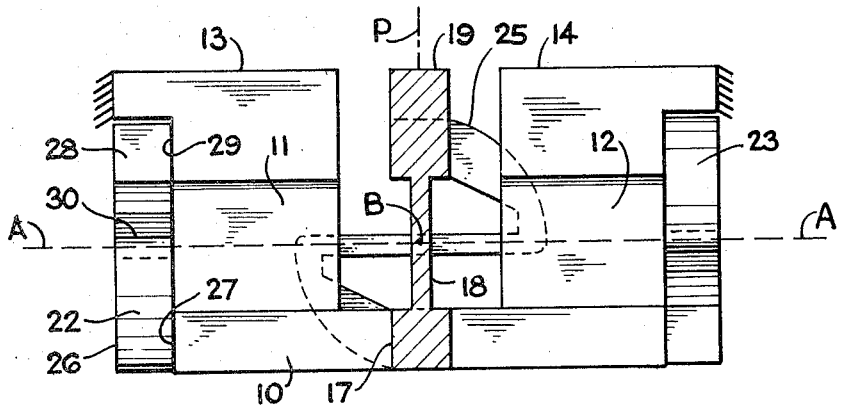
FIGURE 2 is a cross-section of the flexure of FIGURE 1 with the side flexures properly assembled, taken generally in the direction of the arrows 2—2 of FIGURE 1.

With particular reference to FIGURE 2, it will be noted that the planes of the side flexure webs are substantially co-planar and lie in a generally horizontal direction substantially midway between the base member portions 10, 17 and the top means 13, 14, and 19.

The side flexure web means constitute an important feature in the embodiment of FIGURES 1 and 2 in that, as stated, they will prevent twisting of the first and second principal flexure web means, any such twisting moments simply resulting in compression or tension forces in the plane of the side flexure webs.

Figure 3:
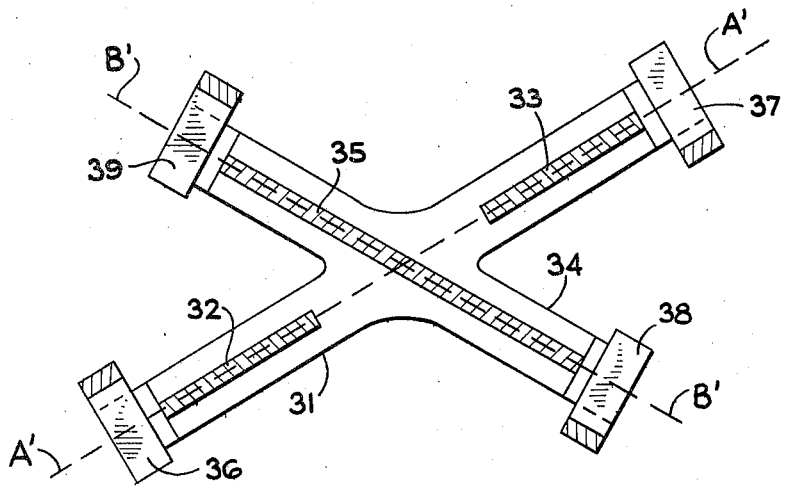
FIGURE 3 is a plan cross-section of a modified embodiment of the flexure of FIGURES 1 and 2.

Referring now to the plan cross-section of FIGURE 3, the universal flexure illustrated is substantially identical to that shown in the exploded view of FIGURE 1 except that the medial bending axes A'—A' and B'—B' intersect at an angle other than a right angle. Thus, as shown, the flexure includes a base 31 having first principal flexure web means 32 and 33 extending generally upwardly, and a base portion 34 having second principal flexure web means 35 extending generally upwardly between the webs 32 and 33. The first and second top supporting means are not illustrated in FIGURE 3 in view of the cross-section taken but are identical to the first and second top means described in conjunction with FIGURE 1.

As in the case of the embodiment of FIGURE 1, there are provided side flexure web means as indicated 36 and 37 for the first principal flexure webs 32 and 33, and at 38 and 39 for the second principal flexure web means 35. These side flexure webs lie generally in a single plane corresponding to the plane of the medial bending axes A'—A' and B'—B' and the individual bending axes of the side flexure webs are in alignment respectively with the principal bending axes.

By disposing the first and second planes in which the first and second principal flexure webs lie at an angle other than a right angle to each other, the resistance to directions of flexing in the flexure plane will vary rather than be uniform as is the case when the flexure axes are at right angles to each other. In other words, flexing in a fore and aft direction will be resisted less than flexing in a left and right direction as viewed in FIGURE 3 when the first top means secured to the flexures 32 and 33 are held stationary and the flexing body is secured to the second top means terminating the upper edge of the second principal flexure web 35.

Figure 4:
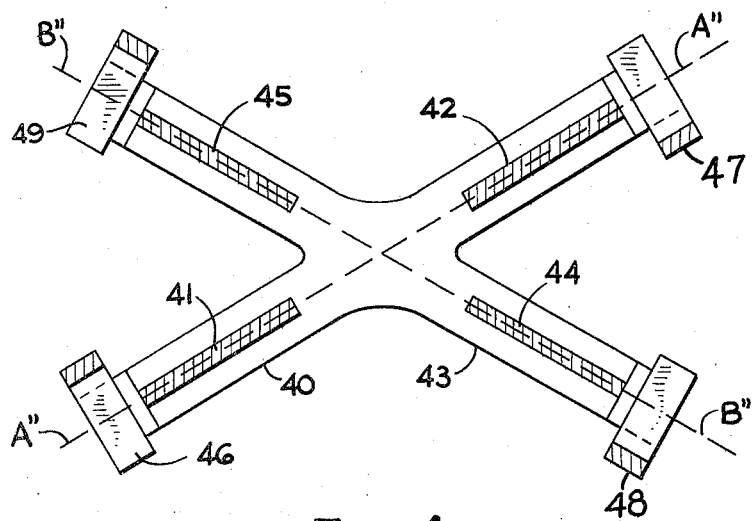
FIGURE 4 is another plan view in cross-section of a further modification of the flexure illustrated in FIGURES 1 and 2.

FIGURE 4 illustrates a universal flexure in which again the first and second medial bending axes designated A"—A" and B"—B" for the first and second principal flexure webs are at an angle different from a right angle. In the embodiment of FIGURE 4, the second principal flexure web is split rather than constituting a continuous web as characterizes the second principal flexure web 35 in the embodiment of FIGURE 3.

As shown in FIGURE 4, the base member includes a portion 40 from which first principal split flexure webs 41 and 42 extend upwardly and similarly a base portion 43 from which second principal split flexure webs 44 and 45 extend upwardly. The upper edges of these webs terminate in suitable top means for securement respectively to a stationary structure and to a body to be mounted. Again, these top means are not shown in view of the cross-section taken but they would be similar to those illustrated in FIGURE 1 except that the top means 19 in FIGURE 1 would be divided to form separate top means, such as the first top means 13 and 14 for the first webs.

Side flexure webs similar to those described in FIGURE 1 are provided at the far ends of the principal flexures as indicated at 46 and 47 for the first principal flexures 41 and 42, and 48 and 49 for the second principal flexures 44 and 45.

The design of the universal flexure illustrated in FIGURE 4 is symmetrical on either side of a horizontal and vertical axis but because of the provision of an angle between the planes of the flexure webs different from 90 degrees, the resistance to flexing in a left and right direction will be greater than the resistance to flexing in a fore and aft direction.

In conjunction with the embodiment illustrated in FIGURE 4, it should be understood that the vertical planes of the first principal flexure webs 41 and 42 and the second principal flexure webs 44 and 45, could be disposed at right angles to each other so that resistance to omni-directional flexing movements would be substantially equal regardless of the direction.

Figure 5:
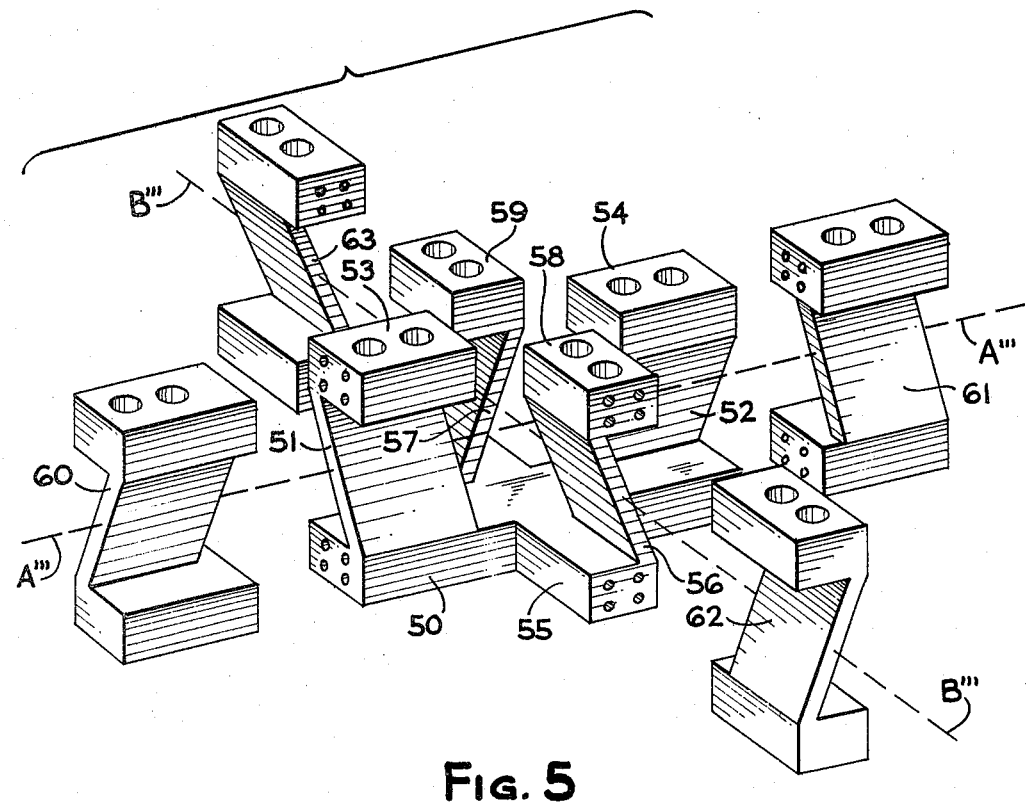
FIGURE 5 is an exploded perspective view of another embodiment of a universal flexure in accordance with the present invention.

FIGURE 5 illustrates still another embodiment of the universal flexure of this invention which is similar to FIGURE 1 except that the principal and side flexures are disposed at angles with respect to the vertical. Thus, there is provided a base member 50 from which a first principal flexure web means in the form of split flexure webs 51 and 52 extend upwardly at angles to the vertical, these flexure webs terminating in first top means 53 and 54. A second portion 55 of the base member supports second principal flexure web means in the form of split webs 56 and 57 extending upwardly at angles to the vertical to terminate in second top means 58 and 59. The medial bending axes of the respective first and second flexure web means intersect at right angles to each other to define the center point about which universal flexural movement can take place.

The flexure of FIGURE 5 is completed by additional side flexures shown in exploded view which serve a different function from the side flexures described in conjunction with FIGURES 1 through 4. In the embodiment of FIGURE 5, the side flexures are indicated at 60 and 61 for the first principal flexure webs 51 and 52 and 62 and 63 for the second principal flexure webs 56 and 57. These side flexure webs, which are referred to as side webs merely as a matter of convenience, are of substantially the same width and angulated with respect to the vertical in an opposite sense to the corresponding flexure webs to which they are secured. Thus, when the device is assembled and viewed in elevational side view as illustrated in FIGURE 6, the side flexure and principal flexures appear to be crossed to form an X shape when viewed along a medial bending axis, such as clearly shown for the side flexure 62 and second principal flexure 56.

Figure 6:
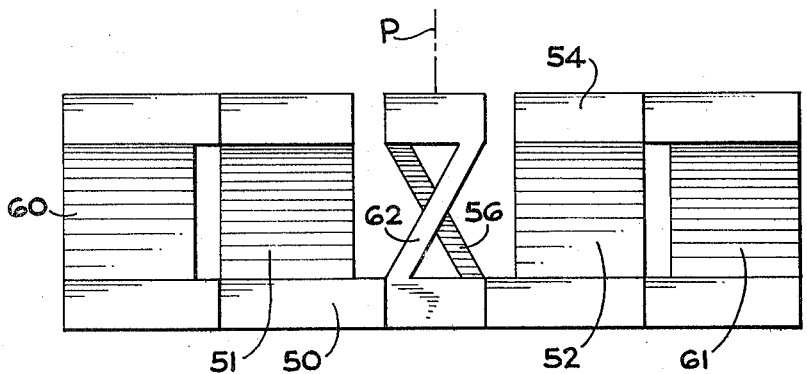
FIGURE 6 is a side elevational view of the assembled flexure unit illustrated in FIGURE 5.

The structures of FIGURES 5 and 6 will enable omni-directional movements to take place and will also serve to resist twisting or torques to the extent that the flexures are tilted with respect to the vertical. The principles involved are similar to those for the side flexures described in connection with FIGURE 1 except that the side flexures in FIGURE 5 are of substantially the same size and strength as the principal flexures in order to provide for proper resistance to compression and tension forces exerted between the base and top means.

In the operation of the flexure of FIGURES 5 and 6, the top means 53 and 54 together with the tops for the first side flexures 60 and 61 would be secured together to a stationary structure. The base portion 50 and 55 as well as the bases of the side flexures 60, 61, 62 and 63 would all be secured together but "floating." The top means 58 and 59 and corresponding tops for the side flexures 62 and 63, would be secured to a body which is to be mounted for omni-directional flexural movement.

Since the medial bending axes for the flexure illustrated in FIGURES 5 and 6 and designated A'''—A''' and B'''—B''' intersect each other at right angles, the flexural movement will take place about the point of intersection and will be resisted substantially equally in all directions in the plane of movement.

Since the medial bending axes for the flexure illustrated in FIGURES 5 and 6 and designated A'''—A''' and B'''—B''' intersect each other at right angles, the flexural movement will take place about the point of intersection and will be resisted substantially equally in all directions in the plane of movement.

It is to be understood in conjunction with the description of the various flexures herein that the actual flexing movement takes place over only very small distances which distances have been somewhat exaggerated in the showing of FIGURE 1 for the axis P. Since this movement takes place about a single point corresponding to the intersection of the medial bending axes of the principal flexures, the movement actually takes place in a spherical surface, the center of which corresponds with this point of intersection. However, since the movement is small, it may be considered to lie substantially in a plane, this plane, as stated, coinciding substantially with the plane of the mounting means for the first top portions of the first principal flexure webs. As a matter of convenience, therefore, the movement is described herein and in the appended claims is referred to as occurring substantially in a plane.

Further, the term "side flexures" has been used to designate both the type of side flexures depicted in FIGURE 1 as well as the additional flexures depicted in FIGURE 5 to provide cross-type flexures. The term "side flexure" as thus used is meant to be comprehensive in the absence of further limiting language.

While only a few different embodiments have been set forth herein, it is to be understood by those skilled in the art that the principal flexure web means and the side flexure web means may take various forms, the overall combination thereof constituting the inventive feature which results in the provision of a universal flexure joint. While only certain embodiments have been set forth and described in detail, many variations falling clearly within the scope and spirit of this invention will occur to those skilled in the art. Thus, the side flexures as described may have their bases and tops integrally formed with the base and tops of the principal flexures. In this respect, the term "secured" is meant to include an integral connection. The universal flexures are therefore not to be thought of as limited to the particular examples set forth merely for illustrative purposes.

What is claimed is:

1. A universal flexure comprising: a floating base member; first top means; first principal flexure web means extending between said base member and said first top means and defining a first medial bending axis in one direction; a second top means; and second principal flexure web means extending between said base member and said second top means and defining a second medial bending axis in a direction different from said one direction, said second top means being substantially in the plane of said first top means whereby said second top means may be flexed omni-directionally relative to said first top means substantially in a plane including said first and second top means.

2. A universal flexure according to claim 1, in which said first and second medial bending axes are co-planar and cross each other at a given angle.

3. A universal flexure according to claim 2, in which said given angle is a right angle.

4. A universal flexure according to claim 2, in which said given angle is other than a right angle.

5. A universal flexure according to claim 2, including first side flexure web means secured between said base member and said first top means; and second side flexure web means secured between said base member and said second top means, the medial bending axes of said first and second side flexure web means being aligned respectively with said first and second medial bending axes of said first and second principal flexure web means, and the planes of said first and second side flexure web means forming angles respectively with the planes of said first and second principal flexure web means.

6. A universal flexure comprising: a floating base member having first principal flexure web means extending upwardly in a first plane with said first principal flexure web means terminating in first top means adapted to be secured to a stationary structure; and a second principal flexure web means extending upwardly from said base member in a second plane forming a given angle with respect to said first plane, said second principal flexure web means terminating in second top means adapted to be secured to a body member, said second top means being substantially in the plane of said first top means whereby said second top means may be flexed omni-directionally relative to said first top means substantially in a horizontal plane defining the plane of securement of said first top means to said stationary structure.

7. A universal flexure according to claim 6, in which said first and second planes are vertical and said given angle is substantially a right angle.

8. A universal flexure according to claim 6, in which said first and second planes are vertical and said first given angle is different from a right angle.

9. A universal flexure according to claim 6, in which said first and second planes are vertical, said first principal flexure web means being split to define co-planar flexure webs with a given spacing between adjacent vertical edges, said second principal flexure web means passing through said given spacing so that the medial bending axes of said first and second principal flexure web means are co-planar.

10. A universal flexure according to claim 6, in which said first and second planes are vertical, said first principal flexure web means being split to define co-planar flexure webs with a given spacing between adjacent vertical edges, said second principal flexure web means being split to definite co-planar flexure webs with a given spacing between adjacent vertical edges, so that a central area free of flexure webs is defined at the intersection of said first and second planes and so that the medial bending axes of said first and second principal flexure web means are co-planar.

11. A universal flexure according to claim 6, in which said first plane is tilted at an acute angle to the vertical and said second plane is tilted at an acute angle to the vertical; first side flexure web means secured between said base member and said first top means and lying in a plane tilted from the vertical in an opposite direction to said first plane; and second side flexure web means secured between said base member and said second top means and lying in a plane tilted from the vertical in an opposite direction to said second plane whereby said principal and side flexure web means appear as an X when viewed along their medial bending axes.

12. A universal flexure according to claim 6, in which said first and second planes are vertical; first side flexure web means secured between said base member and said first top means; and second side flexure web means secured between said base member and said second top means.

13. A universal flexure according to claim 12, in which the plane of said first and second side web flexure means includes the medial bending axes of said first and second principal flexure web means.

References Cited by the Examiner

UNITED STATES PATENTS 2,966,049 12/1960 Ormond _____ 64—15
3,169,613 2/1965 Webb _____ 189—36

FRANK L. ABBOTT, *Primary Examiner.*

RICHARD W. COOKE, JR., *Examiner.*